Figure 1:
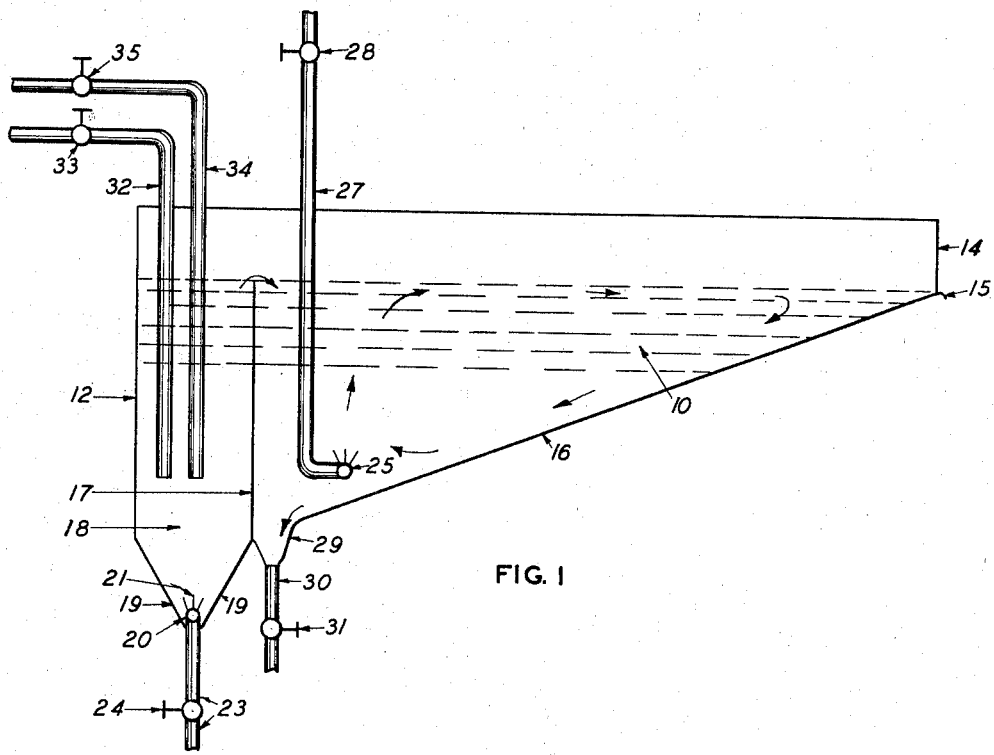

Jan. 26, 1932.  J. R. ALLISON  1,842,372
METHOD OF DESANDING ROTARY MUD
Filed March 30, 1929   2 Sheets-Sheet 1

JOHN R. ALLISON
INVENTOR

ATTORNEY

Patented Jan. 26, 1932

1,842,372

UNITED STATES PATENT OFFICE

JOHN RAYMOND ALLISON, OF WHITTIER, CALIFORNIA

METHOD OF DESANDING ROTARY MUD

Application filed March 30, 1929. Serial No. 351,431.

The general object of my invention is to effect a rapid, economical and relatively complete separation of sand or other crystalline granular matter from aqueous suspensions of clay.

A specific object of my invention is to effect the separation of naturally intermixed sand and other foreign substances from clay slurries destined to be chemically treated or to be used in the manufacture of brick, tile or pottery.

A specific object of my invention is to remove from rotary drilling mud (circulating fluid) the sandy or rocky cuttings produced by the drill, in order that the mud may be kept in continuous circulation without becoming loaded with such abrasive substances as cause damage to pumps, drill pipe and casing.

Clays used in the ceramic industries and certain clays and clay-like materials which are treated with acid for the production of decolorizing powders often contain material quantities of sand and other heavy pulverulent bodies which are difficult to separate cheaply. One method of removing such bodies is to reduce the clay to the condition of a slurry by mixing with water, and to separate the sand from such slurry by sedimentation, centrifugation or filtration. The last named step is liable to be unduly costly, particularly if the proportion of foreign matter be large. The use of the centrifuge is difficult because of the tendency of the sand to form solid and immovable masses in the bowl, requiring intermittent operation and the removal of the detritus from the machine by hand. Simple sedimentation is cheap, but many clays, even when reduced to a thin slurry, are of such nature as to retain the foreign matter strongly and thus cause the rate of settlement to be very low, while the sediment thus separated tends also to retain and thus wast a material proportion of the clay.

The circulating fluid or mud used in drilling deep wells with rotary apparatus presents a particularly difficult problem of this nature. On account of the great quantities of fluid required during the drilling of a hole it is entirely impracticable to discard the once used mud and continuously introduce a new supply. The mud returned from the well must be circulated, withdrawing only such quantity as to compensate the mud produced by the drilling operation and adding sufficient water to maintain the mud at the desired degree of fluidity. So long as the bit is working in clay or soft shale the cuttings produce a mere addition to the volume of fluid without materially changing its quality, but when strata of sand, gravel, sandstone or hard rock are penetrated the cuttings, which of course intermix with the circulating fluid, are often or usually of a highly abrasive nature and cause great damage to the drilling apparatus—circulating pumps, drill pipe and casing—and further, as they accumulate in the fluid, are prone to settle out of the column and form a hard layer in the bottom of the hole, leading to lost circulation and twist-offs.

It is therefore highly desirable to continuously remove sand and rock cuttings from the circulating fluid before it goes to the pumps to be returned to the drill string, and many attempts to accomplish this result have heretofore been made but, so far as I know, without any great measure of success. These attempts have depended on the use of gravity difference between the granular portion of the cuttings and the mud itself, this difference being usually a material figure, and have taken the form of simple sedimentation in sumps or in launders, with or without riffles, of sedimentation in inclined flow-boxes with gentle agitation of the mud and withdrawal of the sand at intervals from the lower and entering end of the box.

The reasons for the failure of these methods to produce a satisfactory separation appears to be found in a combination of several fixed conditions:

First, it is not practicable to maintain a large reserve of mud for long time settling, as it is liable to dry out, cake and become unworkable and also as it uses valuable ground space.

Second, the viscosity of the mud must be maintained at a certain minimum which is usually too high for effective settling of solids. If the mud be thinned below this minimum by the addition of too much water it is liable to seep away into porous formations, causing loss of circulation.

Third, it is entirely impracticable to dilute the mud to a ready settling viscosity and thereafter to increase its viscosity by the removal of a portion of the water.

Fourth, many muds are naturally or are deliberately rendered semi-gelatinous and are loaded with finely divided heavy minerals, such as hematite or barytes, for the purpose of restraining high gas pressures. Such muds retain coarser solids very obstinately and do not respond to either sedimentation or centrifugation. Finally, if the centrifuge be used to increase the gravity difference and thus to separate solids which will not sediment, the sand layer usually carries down so much entrained clay that it forms a solid mass which cannot be continuously discharged from the centrifuge, but must be removed by hand labor.

I avoid these difficulties and am thus enabled to separate granular matter even from viscous muds, either by sedimentation or by centrifuging, by the application of my simple and effective invention. This invention consists substantially in adding to the mud, either prior to or during the stage of actual separation according to whether the process is conducted in an intermittent or a continuous manner), a liquid which I term the parting liquid. This parting liquid must have the following characteristics:—it must be heavier i. e., of greater specific gravity) than the mud or clay slurry; it must be lighter than the sand or other granular solid matter which it is desired to separate from the mud; it must be insoluble in water; it must be noncorrosive and nonreactive; it should be noninflammable and is preferably relatively nonvolatile though this is not an essential characteristic); it has preferably a low viscosity, and finally, it must be free from any tendency to form emulsions when gently agitated with the mud, and finally, it must have the characteristic property of attaching itself to or preferentially wetting crystal faces such as those of sand grains or fragments of crystalline rocks when such crystals are suspended in highly viscous aqueous muds.

Many organic liquids, single or mixed, answer these simple specifications and are available for use in the application of my invention. Thus we have commercial rosin oil (S. G. 1.05), rosin (colophony, solid, S. G. 1.05), coal tar heavy oil (S. G. 1.05 to 1.10), a mixture of carbon tetraclorid and kerosene (S. G. 1.15 to 1.25), mononitrobenzene (S. G. 1.20), dichlorbenzene (S. G. 1.27 to 1.32), carbon tetraclorid (S. G. 1.58), dinitrobenzene (S. G. 1.67) and tetrachlorbenzene (S. G. 1.86). From these bodies mixtures of any desired specific gravity within the stated limits may be made, and the volatility of the mixture is also under almost complete control.

Several of the substances above named are quite expensive, particularly those having the higher specific gravities, and a cheap and nonvolatile material for this use is much to be desired.

By acting directly on coal tar oil (either the so-called "middle oil" or "anthracene oil") with clorin gas a clorinated oil may be prepared in almost any specific gravity desired, from 1.05 up to 2.50 or even higher, this product being insoluble in water, nonreactive and nonvolatile at ordinary temperatures. This material, which is referred to in certain of the appended claims as "clorinated coal tar oil" is particularly adapted to the practice of my invention. It may be clorinated to the desired specific gravity, or a portion of the oil may be further clorinated to an excessive weight and then blended back with untreated oil to the desired weight. The coal tar oil used for this treatment is an article of commerce at a low price, and need not be purified other than by a simple distillation from the crude coal tar to free it from pitchy constituents, followed by chilling to remove the major part of the (solid) naphthalene and anthracene. The residual oil left after the extraction of tar acids for the manufacture of phenol is a desirable raw material for clorination.

The addition of a small proportion of rosin or of rosin oil is advantageous in that it adds to the tendency of the parting fluid to preferentially wet the sand grains.

The ordinary specific gravity of a drilling mud ranges from 1.12 to 1.20. Where the fluid is loaded with hematite or barytes it will be materially heavier, and where a clay slurry is to be separated it may be heavier or lighter than 1.20. It is therefore impossible to specify any exact specific gravity for the parting liquid, but it must be definitely heavier and preferably not less than 0.1 heavier than the mud or clay slurry, and it must always be lighter than the sand to be separated, the specific gravity of which may be taken at approximately 2.50. Between these limits, the heavier the parting fluid the more rapidly will it operate to separate the sand from the mud.

My new process may be conducted with intermittent agitation and settling, or continuously with coincident agitation and settling, or continuously in a centrifugal apparatus. In each case the process consists of three steps, which in the first instance are successive in point of time, while in second and third they are successive only in point of order.

These steps are: first, intermixture of the parting liquid with the mud or slurry, during which intermixture the parting liquid is diffused through the mud in the form of droplets by which the sand grains are wetted in preference to the suspended clay particles; second, a period of quiescence in the first alternative, of slow movement in the second or of rotative motion in the third, during which the oil-wetted sand grains are rejected by the mud and are carried to the bottom or the side of the retaining vessel as the case may be; and third, the separation by simple parting from the mud of the layer of intermixed sand and parting liquid which forms during the second stage. A fourth step, corrollary to my invention but not a part of it, comprises the separation from the sand of the larger part of the parting liquid and its return to the cycle.

In the first and simplest application of my invention, the mud or slurry is run into a tank provided with an air blast or other means of producing agitation. A sufficient quantity of the parting liquid is then introduced and gently agitated with the mud until it is evenly diffused throughout the mass, avoiding any violent agitation such as might produce frothing of the mud or emulsification of the liquid with the mud. The proper end point for the agitation is learned by experience, but in general terms this step is completed when a hand sample placed in a glass cylinder rapidly separates a layer of the parting fluid intermixed with sand.

Agitation is now discontinued and the mixture allowed to stand until the parting fluid and sand have subsided as completely as possible. This sedimentation is usually quite rapid. When subsidence is complete the contents of the tank will be found in two layers; the lower of sand wetted with the parting fluid, which may sometimes form an intermediate layer above the sand, and an upper layer of mud substantially free from sand or other granular crystalline material. These layers may be parted in any convenient manner, thus, the sand and liquid layer may be withdrawn from the point of the tank if it is provided with a conical bottom, or the mud layer may be decanted and the sand-liquid layer then removed.

Figure 2:
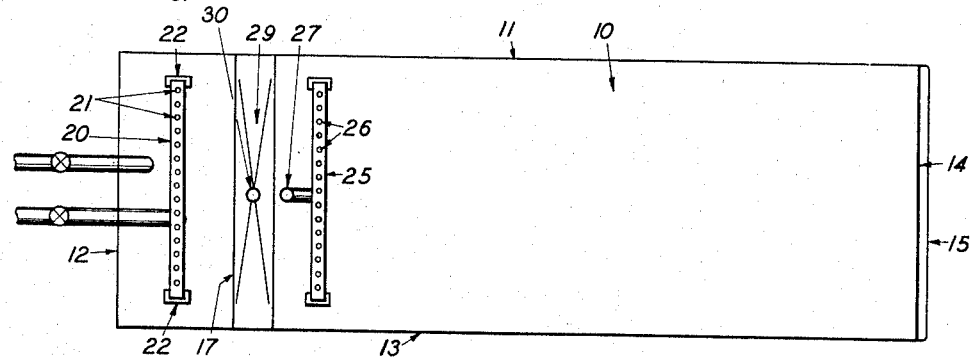

A preferred method of applying my invention to continuous separation is shown in Figures 1 and 2 of the attached drawings. It will be understood that the apparatus shown in these figures is not of my invention and that its disclosure is merely illustrative of a manner in which my method invention may be applied.

Referring to Figs. 1 and 2, in which Fig. 1 is a vertical longitudinal section and Fig. 2 a plan view of the apparatus, 10 is a rectangular tank or trough of sheet metal or matched wood. This tank has three vertical sides 11, 12 and 13, but the end 14 is left open and may desirably be equipped with a lip 15. The greater part of the flat bottom 16 slopes rather sharply toward a partition 17, of less height than the walls 11 and 13, which divides the tank into two compartments of unequal size. The smaller compartment or well 18 has a V-shaped bottom as indicated at 19—19. Above this V is located an air distributing pipe 20 having a number of upwardly looking perforations 21—21 and closed at its ends as indicated at 22—22. This distributing pipe may be supplied with air under pressure by means of a pipe 23 controlled by a valve 24.

A similar air distributing pipe 25 is placed in the deeper end of the larger compartment and at a material distance above the bottom. This pipe has perforations 26 and is supplied with air under pressure through a pipe 27 controlled by a valve 28.

At the deeper end of the long compartments it is desirable to form a sand well 29 having a bottom which slopes in all directions toward a centrally located drain pipe 30 controlled by a valve 31.

A pipe 32 controlled by a valve 33 admits a flowstream of mud or slurry to the well 18 and a pipe 34 controlled by a valve 35 similarly admits a flowstream of the parting liquid. Both of these pipes should terminate some distance below the surface of the mud contained in well 18. It is desirable that the partition wall 17 be carried to the same height as the upper and outer end of the sloping bottom 16, so that the liquid level in the two compartments may be substantially the same.

This apparatus, when applied to the carrying out of my invention, functions in the following manner. Valve 33 being opened, well 18 fills with the mud or slurry to be treated, a stream of parting liquid being simultaneously introduced by opening valve 35. By opening valve 24 to the proper degree a stream of air may be caused to issue from each of the perforations 21, thus rather strongly agitating and intermixing the contents of the well.

The feed being continued, the mixture overflows the partition 17 and fills the larger compartment. A small feed of air may now be supplied to the perforations 26 by partially opening valve 28, this air supply being only sufficient to impart a gentle rolling motion to the contents of this compartment, avoiding strong agitation. This rolling motion, which will be generally in the direction indicated by the arrows in Fig. 1, often assists in settling, but the use of this step is optional and not always advisable.

The feed being still continued, the mud flows over lip 15 and may be conducted by a launder or trough not shown to a point of use or disposition. In its slow passage through the length of the tank the mud separates from the sand and parting liquid, which subside to the sloping bottom 16 and gravitate slowly to the well 29. From this well they may be withdrawn continuously or intermittently by opening valve 31. If the apparatus is properly controlled the mud flowing over lip 15 will be substantially free from sand or other crystalline matter.

Figure 3:
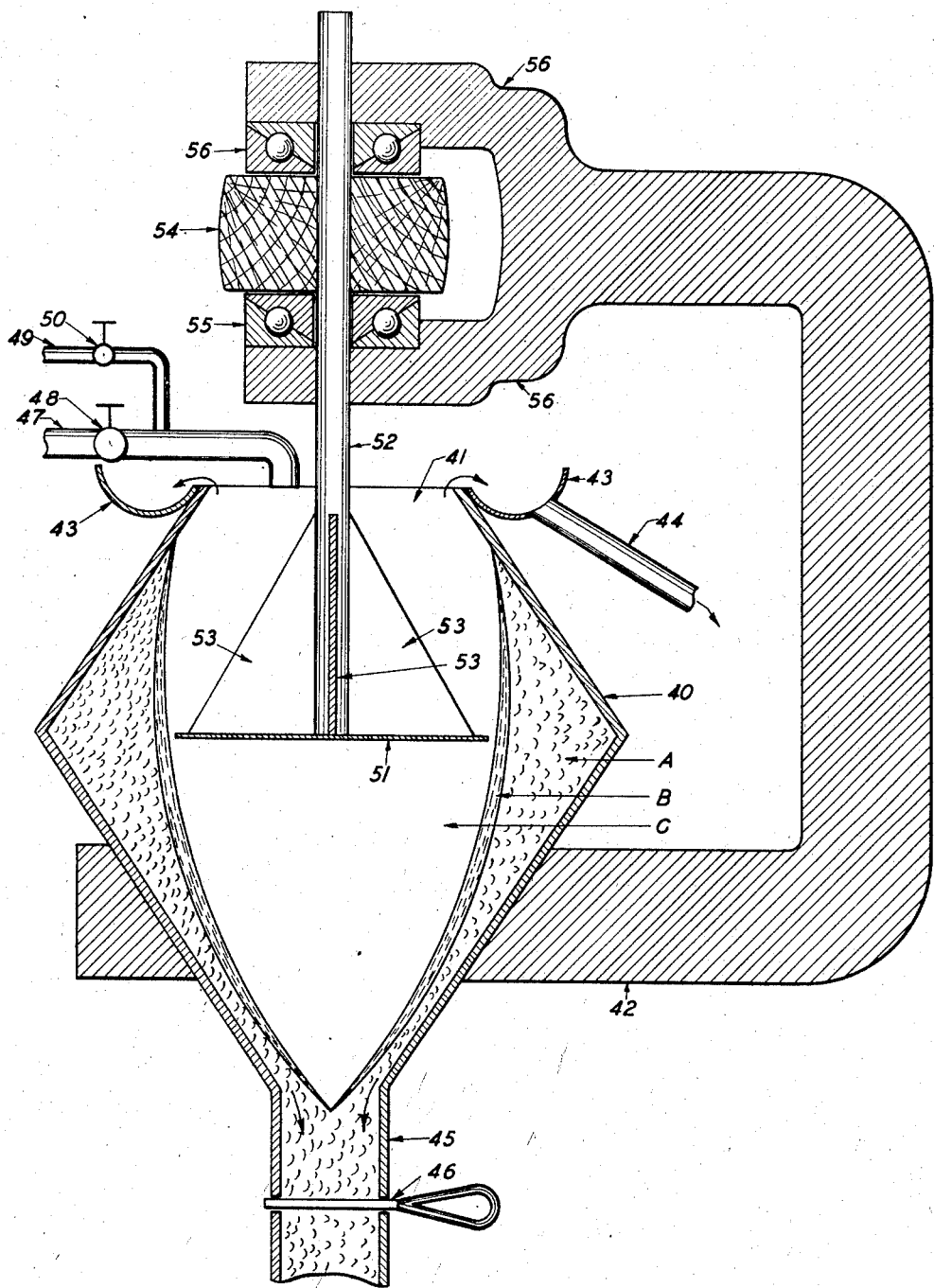

Another preferred method of applying my invention to continuous separation is shown in Fig. 3 of the attached drawings. It will be understood that the apparatus shown in this figure is not of my invention and that its disclosure is merely illustrative of a manner in which my method invention may be applied.

Referring to Fig. 3, 40 is a metallic shell of which any horizontal section is circular, and which may have either the angular vertical section shown or a rounded shape as preferred. This shell has a circular upper opening 41.

The shell or bowl is rigidly attached to a support 42 which in turn is supported in a vertical position by any convenient stand or foundation not shown. A ring shaped trough 43 surrounds the circular opening and is provided with a pipe or spout 44 through which any liquid flowing into the trough may drain away. A pipe 45 is fixed to the bottom of the bowl and provided with any suitable form of gate or valve, indicated at 46, for controlling the flow of a semifluid sandy mass. A pipe 47 controlled by valve 48 communicates with a source of supply of mud to be treated and a pipe 49 controlled by a valve 50 communicates with a source of supply of parting liquid.

Centrally in the bowl is placed a metallic disc 51 affixed to the lower end of a vertical shaft 52, the shaft and the disc being further connected by a plurality of oppositely disposed vanes 53, of which two are shown in side elevation and one in vertical section in the figure. The shaft is suitably attached to a pulley 54 and is supported by suitable bearings, such as the two radial thrust bearings conventionally indicated at 55. These bearings in turn are supported by forked arm 56, which is a part of the support 42 to which the bowl 40 is attached. The shaft, disc and vanes are designed to be rotated at high speed by a belt running on pulley 54, or in any other convenient manner, and when so rotated will set the liquid contained in the bowl in rapid rotary motion.

In the application of this apparatus to the practice of my method invention it functions as follows:

Valve 46 is first closed and the shaft 52 bearing disc 51 and vanes 53 is set in rapid rotation. Valve 48 is then opened to admit a continuous supply of the mud to be treated and at the same time valve 50 is partially opened and so regulated as to introduce with the mud a desired proportion of parting liquid. In falling into the vortex produced by the rapid rotation of the rotor the two liquids are thoroughly intermixed and the sand contained in the mud is caused to be wetted by the parting liquid. The mixture passing into rotation is subjected to centrifugal force and the sand and parting liquid are thrown to the outside of the bowl, from which they gradually make their way downward and may be continuously withdrawn by leaving the valve 46 open. In Fig. 3 the layer of sand thus accumulating and moving downwardly is indicated at A, while B indicates a layer of parting liquid which accumulates between the sand and the mud and which moves downwardly with the sand, while C indicates the body of mud within the bowl, from which the sand has been removed. On continuing this operation mud substantially free from sand overflows into the trough 43 and flows out of the spout 44, while a combined stream of sand and parting liquid flows out of the lower opening 45.

The quantity of parting liquid required to produce the results above described will vary over a rather wide range, the quantity required increasing mainly as the proportion of sand in the mud increases. The quantity of parting liquid used must be such as to produce a fluent mass with the sand which separates from the mud. As an illustration and without limiting myself to this specific proportion I have found that in centrifuging ordinary drilling muds a proportion of one part parting liquid to ten parts mud gives a satisfactory result.

As the result of any of the treatments above described we have two products, one a mud or slurry from which the sand has been removed and which is ready for any desired use or treatment, the other a mixture of sand or other crystalline matter with the heavy parting fluid. The quantity of parting fluid used will be such that a material proportion of it may be regained by simply allowing the sand to settle out and decanting the clear liquid, which may then be returned to the source of supply of parting liquid for reuse.

A further quantity may be regained by flowing the sand onto a screen of such fineness as will retain the sand and allow the fluid to drain through. This operation may obviously be performed advantageously with a rotating vacuum filter press. The last of the parting fluid may be regained by washing the sand with water either on the screen or on the drum of the rotating press and separating the oil thus removed from the wash water. The oil being heavier than water will form the bottom layer which may be parted in a settling tank in any convenient manner.

In the attached claims where I refer to "mud" I would be understood to mean an aqueous suspension of finely divided insoluble mineral matter, such as clay or earth, said suspension having a fluent consistency. Where I refer to "sand" I would be understood to include fine gravel or grit and fragments, chips or cuttings of hard rock of any character.

I claim as my invention:

1. The method of separating sand from a fluent aqueous mud which comprises: intimately intermixing with said mud a parting liquid substantially insoluble in water, specifically heavier than said mud and having the property of preferentially wetting crystalline solids; separating said sand together with said parting liquid from said mud by gravity difference and withdrawing said mud from said sand and parting liquid.

2. The method of separating sand from a fluent aqueous mud which comprises: continuously intimately intermixing with said mud a parting liquid substantially insoluble in water, specifically heavier than said mud and having the property of preferentially wetting crystalline solids; continuously separating said sand together with said parting liquid from said mud by gravity difference and withdrawing said mud from said sand and parting liquid.

3. The method of separating sand from a fluent aqueous mud which comprises: continuously intimately intermixing with a rapidly rotating body of said mud a parting liquid substantially insoluble in water, specifically heavier than said mud and having the property of preferentially wetting crystalline solids; continuously separating said sand together with said parting liquid from said mud by gravity difference accentuated by said rotative motion, and withdrawing separately the mud and the mixture of sand and parting liquid.

4. The method of separating sand from a fluent aqueous mud which comprises intimately: intermixing with said mud a parting liquid substantially insoluble in water, specifically heavier than said mud and having the property of preferentially wetting crystalline solids, said parting liquid comprising a chlorinated organic liquid; separating said sand together with said parting liquid from said mud by gravity difference and withdrawing said mud from said sand and parting liquid.

5. The method of separating sand from a fluent aqueous mud which comprises: continuously intimately intermixing with said mud a parting liquid insoluble in water, specifically heavier than said mud and having the property of preferentially wetting crystalline solids, said parting liquid comprising a chlorinated organic liquid; continuously separating said sand together with said parting liquid from said mud by gravity difference, and withdrawing said mud from said sand and parting liquid.

6. The method of separating sand from a fluent aqueous mud which comprises: continuously intimately intermixing with a rapidly rotating body of said mud a parting liquid insoluble in water, specifically heavier than said mud and having the property of preferentially wetting crystalline solids, said parting liquid comprising a chlorinated organic liquid; continuously separating said sand together with said parting liquid from said mud by gravity difference accentuated by said rotative motion, and withdrawing separately the mud and the mixture of sand and parting liquid.

7. The method of separating sand from a fluent aqueous mud which comprises: intimately intermixing with said mud a chlorinated coal tar oil specifically heavier than said mud; separating said sand together with said oil from said mud by gravity difference, and withdrawing said mud from said sand and said oil.

8. The method of separating sand from a fluent aqueous mud which comprises: continuously intimately intermixing with said mud a chlorinated coal tar oil specifically heavier than said mud; continuously separating said sand together with said oil from said mud by gravity difference, and withdrawing said mud from said sand and oil.

9. The method of separating sand from a fluent aqueous mud which comprises: continuously intimately intermixing with a rapidly rotating body of said mud a chlorinated coal tar oil specifically heavier than said mud; continuously separating said sand together with said oil from said mud by gravity difference accentuated by said rotative motion, and withdrawing separately the mud and the mixture of sand and oil.

In witness that I claim the foregoing I have hereunto subscribed my name this 23rd day of March, 1929.

JOHN RAYMOND ALLISON.